United States Patent
Xu et al.

(10) Patent No.: US 8,732,777 B2
(45) Date of Patent: May 20, 2014

(54) SYSTEM AND METHOD FOR CONTENT COMMUNICATION

(75) Inventors: Yan Xu, Beijing (CN); Xiaojun Ma, Beijing (CN); Jun Li, Beijing (CN)

(73) Assignee: Thomson Licensing, Boulogne-Billancourt (FR)

( * ) Notice: Subject to any disclaimer, the term of this patent is extended or adjusted under 35 U.S.C. 154(b) by 949 days.

(21) Appl. No.: 12/448,585

(22) PCT Filed: Jan. 11, 2007

(86) PCT No.: PCT/CN2007/000120
§ 371 (c)(1),
(2), (4) Date: Jun. 25, 2009

(87) PCT Pub. No.: WO2008/083523
PCT Pub. Date: Jul. 17, 2008

(65) Prior Publication Data
US 2010/0058406 A1    Mar. 4, 2010

(51) Int. Cl.
*H04N 7/173* (2011.01)
(52) U.S. Cl.
USPC ............ 725/97; 370/395.21; 370/395.4; 370/395.43
(58) Field of Classification Search
None
See application file for complete search history.

(56) References Cited

U.S. PATENT DOCUMENTS

| | | | |
|---|---|---|---|
| 5,561,456 A * | 10/1996 | Yu | 725/97 |
| 5,594,491 A * | 1/1997 | Hodge et al. | 725/103 |
| 5,964,829 A | 10/1999 | Ozden et al. | |
| 6,216,006 B1 * | 4/2001 | Scholefield et al. | 455/450 |
| 6,219,704 B1 * | 4/2001 | Kim et al. | 709/224 |
| 7,434,242 B1 * | 10/2008 | Goode | 725/9 |
| 2002/0006801 A1 * | 1/2002 | Siren | 455/461 |
| 2002/0049804 A1 * | 4/2002 | Rodriguez et al. | 709/200 |
| 2004/0098470 A1 | 5/2004 | Kurihara | |
| 2004/0133907 A1 * | 7/2004 | Rodriguez et al. | 725/14 |

FOREIGN PATENT DOCUMENTS

| | | | |
|---|---|---|---|
| CN | 1487457 | 4/2004 | |
| CN | 1697511 | 11/2005 | |
| JP | 10-91466 | 4/1998 | |
| JP | 2002-112231 | 4/2002 | |
| JP | 2004-312746 | 11/2004 | |
| JP | 2006-108831 | 4/2006 | |
| WO | WO2005098674 | 10/2005 | |
| WO | WO 2005098674 A1 * | 10/2005 | G06F 17/30 |

OTHER PUBLICATIONS

International Search Report, dated Oct. 25, 2007.

* cited by examiner

*Primary Examiner* — Robert Hance
(74) *Attorney, Agent, or Firm* — Robert D. Shedd; Reitseng Lin

(57) ABSTRACT

A system such as a multicast VOD system communicates content, e.g., delivers content or receives content, responsive to a user request for content and according to a schedule adapted to a user-specified acceptable latency for content delivery. The schedule may be modified to minimize initiation of delivery of content in response to the user's request. The schedule may also be modified to delay delivery of subsequent portions of the content as late as possible to allow subsequent requests to share a content stream while not exceeding the acceptable latency parameter specified by the user.

8 Claims, 5 Drawing Sheets

SYSTEM AND METHOD FOR CONTENT COMMUNICATION

This application claims the benefit, under 35 U.S.C. § 365 of International Application PCT/CN2007/000120, filed Jan. 11, 2007 which was published in accordance with PCT Article 21(2) on Jul. 17, 2008 in English.

FIELD OF THE INVENTION

The present invention generally relates to network communications and, more particularly, to communication of content such as video information via a network.

BACKGROUND OF THE INVENTION

Server bandwidth has been identified as a major bottleneck in large systems communicating content responsive to user demand, such as video on demand (VOD) systems. Dedicating a channel to each client quickly uses up server bandwidth and is non-scalable. To preserve server bandwidth, many users can share a channel using multicast.

There are two types of multicast: periodic broadcast and non-periodic multicast. In a periodic broadcast environment, the server does not wait for service requests. The server broadcasts content cyclically. In the case of video content, cyclical broadcast does not guarantee true VOD. Cyclical broadcasts do keep the worst service latency experienced by any client within a certain limit. In fact, the bandwidth requirement is independent of the number of subscribers to the system. However the benefit of periodic broadcast is limited to content that is frequently demanded such as popular videos.

For content that is not frequently demanded, such as videos which are not very popular, non-periodic multicast can be used. In a non-periodic multicast environment, users make content requests to a server; and the server serves them according to some scheduling policy. A technique referred to as patching allows a new incoming request to join an on-going multicast and therefore takes advantage of the same data stream. Non-periodic multicast approaches can provide true VOD service. However, such approaches, including those that adopt the patching technique, while providing a true VOD service may have a great data burst impact.

SUMMARY OF THE INVENTION

An aspect of the present invention involves recognition that existing content delivery systems may have problematic characteristics such as creating undesirable data burst impact. Another aspect of the present invention involves a method of communicating content that may comprise receiving a request for a content; generating a schedule for delivering the content; determining whether the schedule will satisfy a delay parameter of the request; and modifying the schedule to delay delivery of a portion of the content responsive to determining that the delay parameter is satisfied. Modifying the schedule may further comprise detecting a first time interval of the schedule for delivering the content during which bandwidth is available; and adjusting the schedule for delaying delivery of the portion of the content to occur during the time interval. A request may be received from a client device and the delay parameter may comprise a delay limit established by a user of the client device. The schedule may comprise a plurality of time intervals including a first time interval during which delivery of the portion of the content is scheduled for delivery, the content may comprise a plurality of blocks of information, the portion may comprise a first one of the plurality of blocks of information; and modifying the schedule may comprise determining that additional bandwidth is needed to deliver the portion of the content during the first interval; delaying transmission of the first block to occur during a second time interval during which additional bandwidth is available, the second time interval occurring subsequent to the first time interval; and determining whether a delay in transmission resulting from a delay from the first interval to the second interval exceeds a delay limit associated with the delay parameter.

Another aspect of the invention involves a method of delivering content that may comprise receiving a request for a content; and generating a schedule for delivering the content with a first delay for an initial portion of the content and with a second delay for a subsequent portion of the content, wherein generating the schedule comprises selecting the first delay to minimize the time from receiving the request to delivery of the initial portion of the content, and selecting the second delay to satisfy a delay parameter associated with the request and increase a delay of delivery of the subsequent portion.

Another aspect of the invention involves a method of receiving content that may comprising requesting a content from a content provider; providing a delivery delay limit to the content provider; receiving the content according to a schedule including a first time for starting delivery of an initial portion of the content and a second time for starting delivery of a subsequent portion of the content, wherein the first time minimizes a delay from receiving the request to starting delivery of the initial portion of the content, and the second time satisfies the delivery delay limit while also increasing a delay for starting delivery of the subsequent portion of the content.

Another aspect of the invention involves a system for delivering content that may comprise an interface for receiving a request from a requesting device for a content and receiving a delay parameter from the requesting device; and a scheduler coupled to the interface and responsive to the request for delivering the content to the requesting device according to a schedule, wherein the scheduler modifies the schedule responsive to a delay parameter of the requesting device for delaying delivery of a portion of the content and determines that the delay parameter is satisfied.

Another aspect of the invention involves a method of delivering content that may comprise the steps of receiving a request for a content; generating a schedule for delivering the content in responsive to the request; and transmitting a message indicating a delay time for transmitting the content. The method may further comprise a step of determining whether the schedule will satisfy a delay parameter of the request, wherein if the schedule will not satisfy the delay parameter, the message indicates that the request is denied.

BRIEF DESCRIPTION OF THE DRAWINGS

The present invention may be readily understood by considering the following detailed description in conjunction with the accompanying drawings which include.

Figure 1:
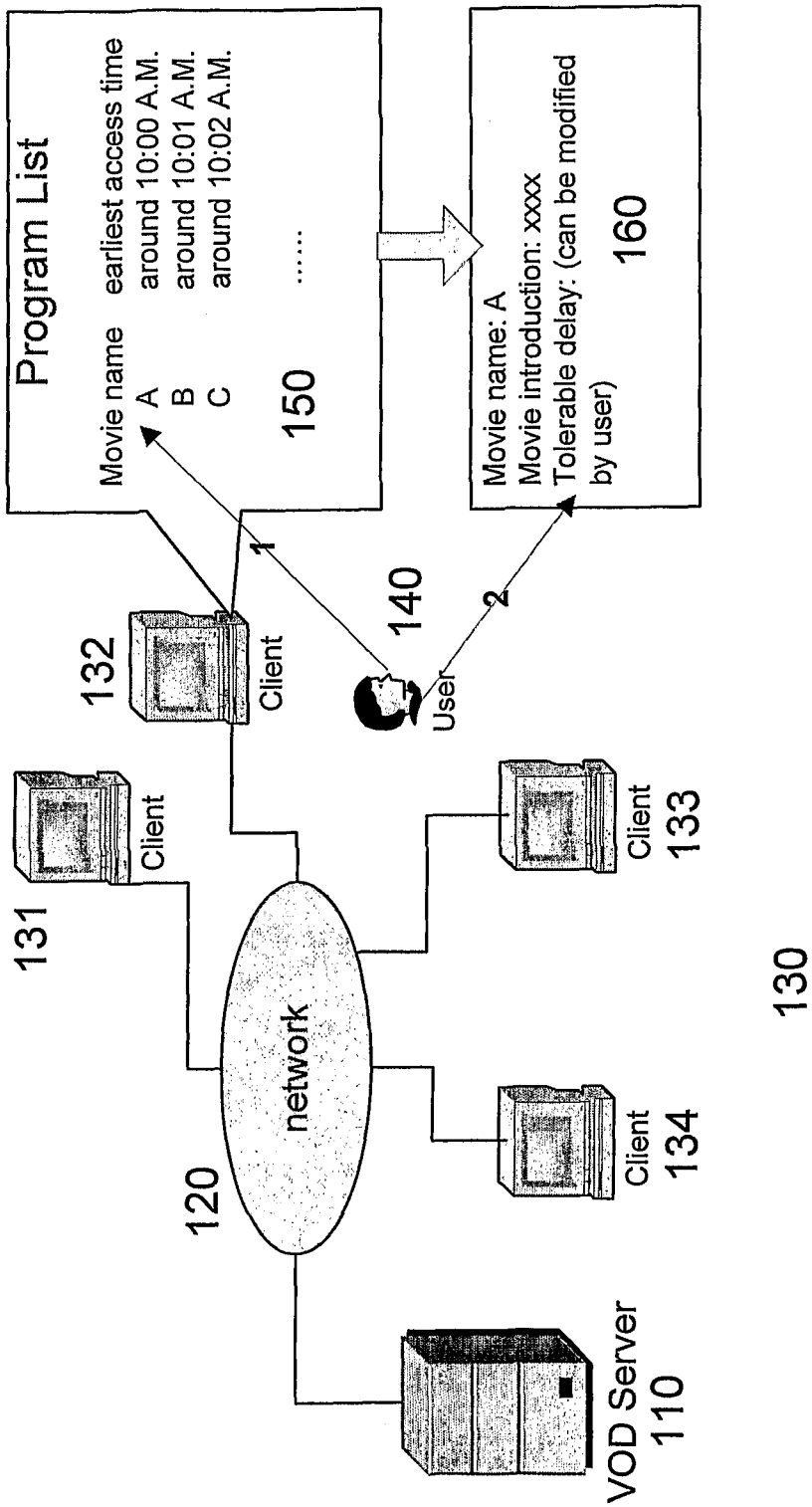
FIG. 1 showing, in block-diagram format, a system incorporating principles of the invention for communicating content responsive to requests from one or more users.

To facilitate understanding of the drawings and the associated description, identical reference numerals have been used in the various figures to identify identical or similar features. It should be understood that the drawings are for purposes of illustrating aspects of the invention and, in particular, for illustrating an exemplary embodiment of the invention. Other configurations and embodiments of systems incorporating principles of the invention are possible.

DETAILED DESCRIPTION

For the purpose of ease of explanation, the following will describe an exemplary embodiment of principles of the invention in a video on demand system, or VOD. However, the invention is broadly applicable to various systems for communicating content between content sources and users. Principles of the invention described herein are applicable to systems delivering and/or receiving all types of content including, but not limited to, video and/or audio. In addition, the content may be communicated via various types of communication networks incorporating various communication media and devices. For example, principles of the invention are applicable to wired and wireless communication networks (e.g., CATV, cell networks, satellite systems, etc.) for providing content to devices including telephones (e.g., wired phones or wireless phones such as cell phones), set top boxes, televisions, computers, etc. In addition, aspects of the invention relate to systems including content storage features and/or capability such as a personal video recorder (PVR). For example, availability of storage capability such as a PVR may enable a later arriving client as described below to join a multicast stream delivering the media data to some earlier clients by buffering the data it received until it is needed for playback.

An exemplary embodiment of a system incorporating principles of the invention as described herein involves a VOD service mode and a related method of scheduling a multicast transmission. The described VOD system can provide to users, customers or clients of the system a list identifying content, e.g., a video name list, and the respective earliest playback time. Providing information regarding time when playback is possible allows each entity requesting content, e.g., customer, client or user, to set a delay parameter or delay limit specifying the requester's preferred or acceptable or tolerable delay accordingly, e.g., by requesting one of the content items in the provided list or by providing information specifying tolerable delay to a server in a separate communication such as during a set-up mode of operation. By receiving the requests from the customers, the system determines whether to accept a request or not according to the available network bandwidth and the user tolerable delay.

For example, FIG. 1 shows a block diagram of an exemplary VOD system including VOD server 110. VOD server 110 serves various client systems identified generally as 130 in FIG. 1 and more specifically as 131, 132, 133, 134 via a network 120. The client systems illustrated in FIG. 1 represent various possible devices such as multimedia devices, personal computers, set-top boxes, televisions, etc. A user 140 requests content from server 110 via one of the client systems, e.g., client 132. In accordance with an aspect of the invention, server 110 provides a list 150 of available content and earliest possible playback time or times to user 140 via client 132. User 140 submits a request 160 via client device 132 requesting one of the listed content items. In accordance with another aspect of the invention, user 140 specifies a delay parameter or delay limit identifying or specifying a delay value that the user would prefer or would find to be a tolerable delay for receiving the content. That is, the user may specify a delay limit or maximum delay acceptable to the user. Such specification of tolerable delay may be provided as part of the request of content or during a setup mode of operation during which a tolerable delay parameter is established. Alternatively, server 110 may propose a tolerable delay, e.g., a default value, that user 140 could accept or refuse or modify via a user interface of client device 132 (e.g., a displayed setup menu).

The system shown in FIG. 1 includes an interface, e.g., in server 110, for receiving requests for content from requesting devices such as client devices 130 and also includes a scheduler, e.g., in server 110, coupled to the interface and responsive to requests for delivering content according to a schedule. The transmission schedule established by the scheduler in server 110 in FIG. 1 for providing or transmitting content to clients is arranged according to the arrivals of the VOD requests. Each request accepted by the system corresponds to a scheduled stream of content. The goal of the schedule is to have each request start to access the content (e.g., view a requested video) at the earliest time and play it back continuously. In accordance with an aspect of the invention, content such as video is partitioned into a plurality of blocks or portions of content data or information. A stream of content provides all portions or blocks of a particular item of content. For each stream, the transmission schedule should transmit the first or initial portion or block of the content, e.g. a video, immediately after the bandwidth is available and transmit the consecutive blocks or subsequent portion of the content as late as possible while not later than their time offset from the first block such that the content may be played back to the user continuously, or at least without unacceptable interruptions. For example, in the case of video content the transmission schedule should provide for transmission of the video content in order to keep video playing out smoothly.

In accordance with a further aspect of the invention, the scheduler may modify or adapt the schedule, e.g., by rearranging the schedule as explained below. For example, the schedule may be modified responsive to a delay parameter or delay limit such as a user-specified tolerable delay to delay delivery of a portion of the content. The delay may provide for delaying transmission of blocks in a stream as late as possible to increase the probability of transmitted blocks of content being utilized to serve multiple requests. That is, if a second request for a video is received subsequent to a first request for the same video, transmission of blocks responsive to the first request may also be used to serve the second and or other succeeding requests. Modification of the schedule by the scheduler to delay delivery as described occurs after determining that the delay satisfies the delay parameter. A further consideration is the need for playing content smoothly.

In more detail, the exemplary VOD system comprises two primary components: VOD server 110 and clients 130. VOD server 110 publishes the play list of the video which include video name and earliest access time. The earliest access time is updated dynamically. Whenever a client is interested in a video, it makes a request in which the information such as video name and user tolerable delay is included. After receiving the request, the VOD server determines whether this request is accepted or not according to the available bandwidth and the user tolerable delay. If the request is accepted, the playback delay may be included in the acknowledge information. If the request is refused, the minimum possible playback delay may be included in the acknowledge information, based on which the client can make another reasonable request if desired.

Figure 2:
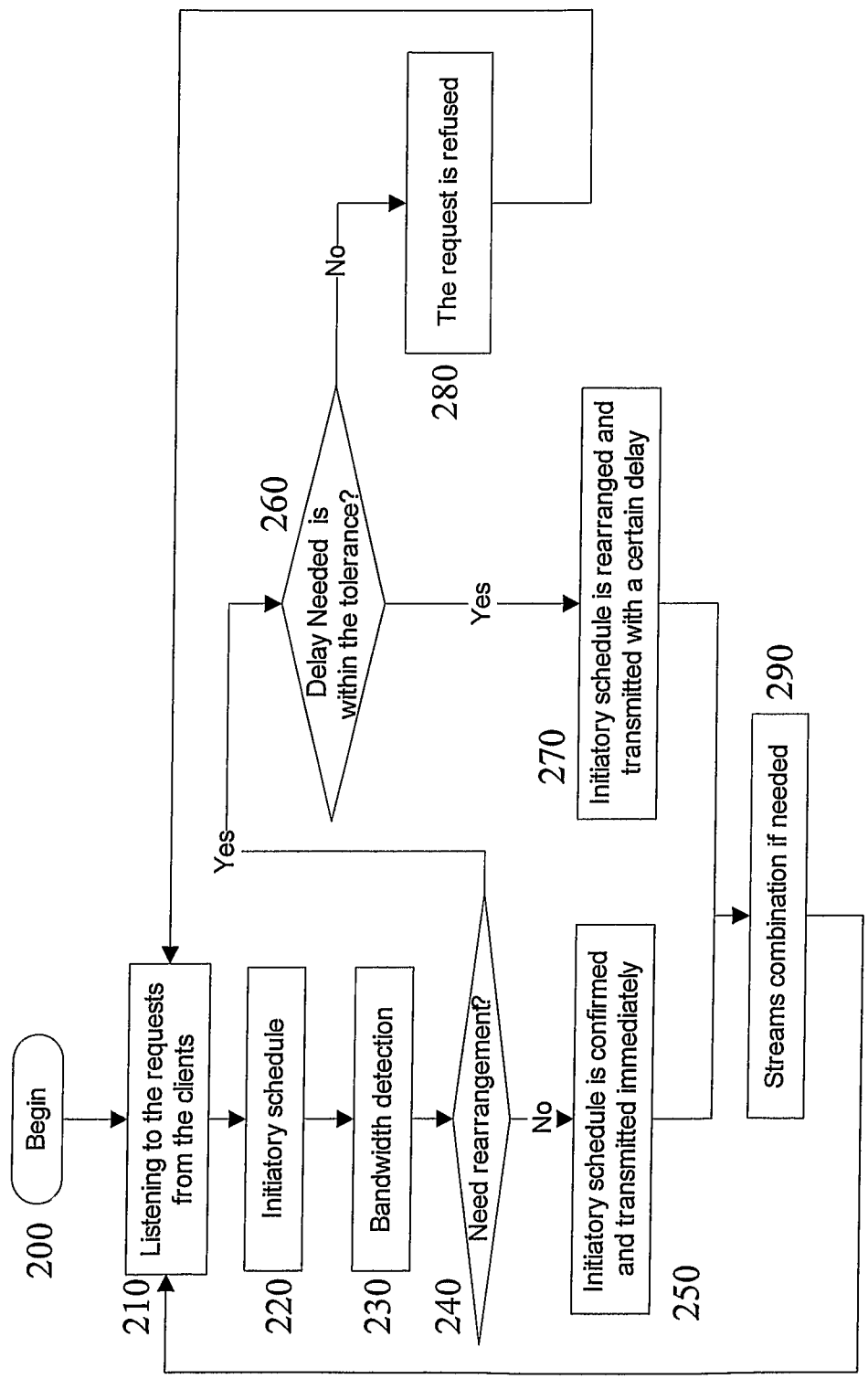
FIG. 2 showing, in flowchart format, an aspect of the system of FIG. 1 relating to scheduling communication of content in accordance with principles of the invention.

An exemplary embodiment of scheduling transmissions is illustrated in flow-chart format in FIG. 2. The embodiment illustrated in FIG. 2 may be implemented in software (e.g., executed by a device such as a computer, or microprocessor, controller, or signal processor integrated circuit) and/or hardware. In FIG. 2, scheduling begins at step 200. Step 200 is followed by step 210 during which one or more clients produce requests for content or the server listens to, or receives, the requests for content. As described in detail below, when a request arrives, the system first schedules a stream for this request and then may combine streams associated with multiple requests, if needed.

For the purpose of describing aspects of FIG. 2, certain terminology will be used as follows. The term "block" will be used to refer to a portion or subset of an item of content. For content such as a video, the video is logically divided into N portions or blocks where, for example, each block has equal size. The size of a block determines the granularity of the schedule. A "stream" refers to a transmitted sequence of blocks representing an item of content such as a video. When a request for content arrives, such as a request for a video, the system will schedule a stream for the request. A scheduled stream presents when and which blocks will be transmitted. Each request corresponds to a scheduled stream. A "transmission period" of a video starts when the first stream (for the first request of the video) starts to transmit. A transmission period ends if no request arrives before all existing streams for the video end. A new transmission period will start if a request for a video arrives after the last transmission period ends. A "reference stream" is the first stream in a transmission period. There is exactly one reference stream in a transmission period. A "time slot" is a video block duration time span, i.e., a time interval during which a block of content is communicated. Video blocks in the same time slot are transmitted at the same time. Each time slot can hold a specific number of video blocks referred to as a time slot's "capacity". If a time slot must hold more blocks than its capacity to implement a particular schedule, then the time slot is referred to as an "overload time slot", i.e., the time slot has no available bandwidth. If a time slot has excess capacity, i.e., a particular schedule would require a time slot to hold fewer blocks than its capacity and therefore the time slot has excess or available bandwidth, the time slot is referred to as an "underload time slot".

Figure 3:
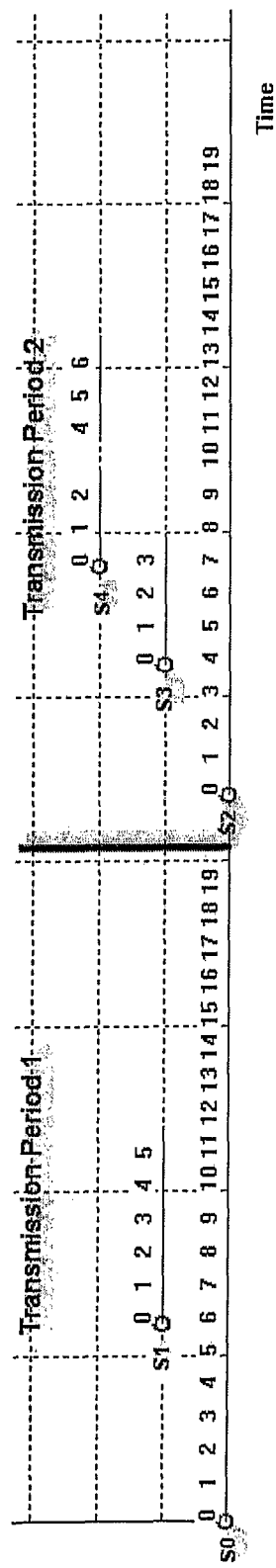
FIG. 3 showing a timing diagram illustrating an aspect of the operation of the system in FIG. 1 for scheduling content communication in accordance with the flowchart in FIG. 2.

FIG. 3 shows a timing diagram for two transmission periods illustrating aspects of the above-defined terminology. The total number of blocks is 20 for the content in FIG. 3. In the transmission period 1, there are 2 streams S0 and S1. In the transmission period 2, there are 3 streams S2, S3 and S4. S0 is the reference stream in the transmission period 1. S2 is the reference stream in the transmission period 2. Only the reference stream transmits all N blocks, preferably consecutively. The first block of the reference stream has a reference time of zero and every other block has a reference time equal to the playback time offset from the first block. Although illustrated as transmitting one block at a given time, the principles of the invention also apply to the scenario where several blocks are transmitted simultaneously at a given time slot.

Figure 4:
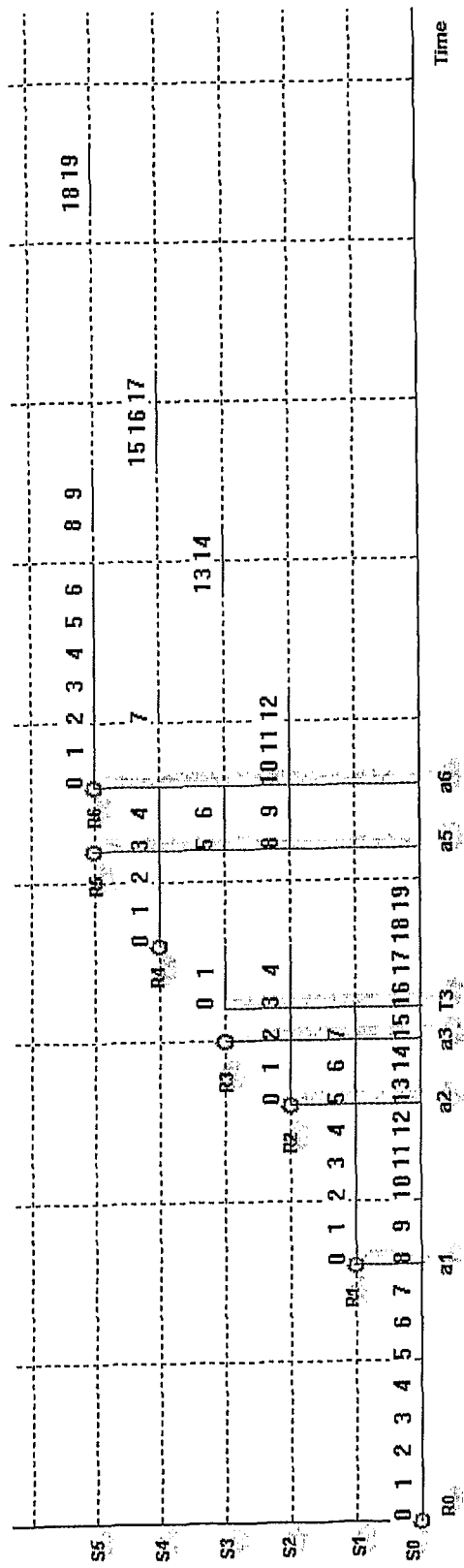
FIG. 4 showing a timing diagram further illustrating operation of the system in FIG. 1 for scheduling content communication in accordance with FIG. 2 and FIG. 3.

In addition to the described terminology, the description herein will use the following symbols:
N denotes the total block number of the video;
B denotes the server bandwidth limit;
b denotes the video playback rate;
$d_i$ denotes the service delay of the ith request (transmission delay is ignored, i.e. if the video is transmitted at $T_i$, then this video can be displayed at $T_i$ and, therefore, the service delay is server bandwidth limitation concerned);
$D_i$ denotes the maximum service delay that the ith user can tolerate;
$a_i$ denotes the arrival time of the ith request in a transmission period (i=0, 1, 2, ... );
$t_{ij}$ denotes the start time of the transmission of the $j^{th}$ block in the $i^{th}$ stream in a transmission period. The granularity of $a_i$ and $t_{ij}$ is the duration of a block. Assume $a_0=0$ $t_{00}=0$, i.e. the first block of the first stream has a reference time of zero;
Ti denotes the transmission time of the ith stream;
$T_i=a_i+d_i$ An example of the operation of the exemplary embodiment for providing scheduling in accordance with aspects of the invention is illustrated in FIG. 4. In FIG. 4, a small circle denotes a request. The number above the solid line denotes the index number of the video block. There are 20 blocks total in the video. The server bandwidth is three times the video rate. $R_i$ denotes the $i^{th}$ request; $S_i$ denotes the $i^{th}$ stream.

For the first request in a transmission period, the scheduler generates a reference stream, that is, to transmit all N blocks consecutively just like in a conventional VOD system, starting at $T_0$, the arrival time of the first request R0. When the $k^{th}$ request arrives, the system schedules a stream for $k^{th}$ request, which is denoted by stream Sk. The schedule procedure in more detail is described below in regard to FIG. 2 and FIG. 4.

After receiving a request, e.g., the $k^{th}$ request, as in step 210 of FIG. 2, an initial or initiatory schedule is created as indicated in step 220 of FIG. 2. The system schedules to transmit those blocks that have been transmitted in $[a_{k-1}, a_k]$. Other blocks are available to the requesting client because they will be transmitted by the existing streams responding to prior requests. All the blocks are scheduled to transmit at their time offset from the first block. The server creates an initial schedule $U_k$ indicating the transmission time of the blocks of the $k^{th}$ stream $S_k$, which is represented as:
$U_k=\{u_{k1}, u_{k2}, \ldots, u_{kv}\}$,
where $u_{ki}$ is the scheduled transmission time of the $i^{th}$ block in the $k^{th}$ stream. The $i^{th}$ block in the $k^{th}$ stream does not necessarily is the $i^{th}$ block of the requested video or content.

Following creation of the initiatory schedule, in step 230 of FIG. 2, bandwidth detection is performed for detecting time slots or time intervals during which bandwidth is available. From the time point $a_k$, the set of the time slots whose bandwidth is above the bandwidth limit is denoted as H where H=$\{h_1, h_2, \ldots h_m\}$. Every $h_i$ comprises two attributes, $h_i=\{h_{i1}, h_{i2}\}$, where $h_{i1}$ denotes the start time of the timeslot and $h_{i2}$ denotes the block number of the $i^{th}$ stream in this timeslot. $h_{i1}$ is referred to as an overload time slot and $h_{i2}$ as an overload block. In $h_i$(i=1, 2, ..., m) is ordered with $h_{i1}$ increased.

From the time point $a_k$, the set of the time slots whose bandwidth is below the bandwidth limit is denoted as L. L=$\{l_1, l_2, \ldots, l_w\}$. Every $l_i$ comprises two attributes, $l_i=\{l_{i1}, l_{i2}\}$ where $l_{i1}$ denotes the start time of the time slot and $l_{i2}$ denotes the difference between the occupied bandwidth and the bandwidth limit. $l_{i2}$ is referred to as depth degree. $l_i$(i= 1, 2, ..., w) is ordered with $l_{i1}$ increased.

In accordance with an aspect of the invention, at step 240 of FIG. 2, the result of bandwidth detection is evaluated. For example, step 240 may include evaluating H. If H is null (i.e., a negative or "NO" result at step 240 in FIG. 2), then the available bandwidth is adequate for transmission of the stream without modifying the initiatory schedule. If so, operation in FIG. 2 proceeds to step 250 where the initiatory schedule is confirmed and transmission occurs immediately according to the schedule. If H is not null at step 240, then modification of the schedule, including rearrangement in accordance with aspects of the invention, may occur at step 270 of FIG. 2. Prior to rearrangement, an evaluation is made at step 260 as to whether or not the delay needed to provide rearrangement is within the requester's tolerance, i.e., satisfies or is in accordance with the user-specified delay parameter or delay limit. If not, the request is refused at step 280. If the delay is tolerable, then schedule modification or rearrangement proceeds at step 270 as explained in detail below.

During step 250, the scheduled stream k will be transmitted at time $T_k$ where $T_k=a_k$ which means the service delay of the $k^{th}$ request is zero. The transmission time of the blocks is $V_k=U_k=\{u_{k1}, u_{k2}, \ldots, u_{ky}\}$. For example, in FIG. 4, when request 2 arrives, the available bandwidth is enough for transmitting a stream. So the stream 2 will transmit those blocks that have been transmitted in $[a_1, a_2]$ without any delay, and the first block of stream 2 will be transmitted at time $T_2$ where $T_2=a_2$.

If the evaluation at step 240 of FIG. 2 indicates that bandwidth is not adequate to support the initiatory schedule, then modification of the initiatory schedule proceeds at step 270. In accordance with an aspect of the invention, schedule modification or rearrangement flattens the bandwidth burst and keeps it close to the original schedule. After rearrangement, there is $T_k>a_k$. If the delay needed di is within the latency tolerance Di, the request is accepted and video blocks will be transmitted according to the schedule rearrangement result. Otherwise, the request is refused at step 280 and an earliest possible start time is sent back to the requester.

An exemplary embodiment of schedule adjustment or rearrangement as in step 270 is described below and shown in more detail in FIG. 5. One aspect of the schedule modification or rearrangement may be to produce a minimum initial delay. Another aspect may be to maximize the degree to which content transmitted for a current request is also shared by later requests. In part, increased sharing provided by the described embodiment results from transmitting blocks as late as possible while doing so in accordance with the delay tolerance indicated by a user.

A first step in the schedule modification is a determination of a set G of the under load time slots. Assume G being generated from L, $G=\{g_1, g_2, \ldots, g_n\}$, where $$n = \sum_{i=1}^{w} l_{i2}$$

and w is the number of elements in L. G can be generated as follows:

$g_1 = l_{11}$ $g_i (i=2, 3, \ldots, n)$ shall be generated according to the following rule:

If $l_{i2}=j$, then $g_s=g_{s+1}=\ldots=g_{s+j-1}=l_{i1}$, where $$s = \sum_{r=1}^{i-1} l_{r2} + 1$$

Next, m elements of G are selected to for a set Q where $Q=\{Q1, Q2, \ldots, Qx\}$, $x=c_n^m$ and m is the number of elements in H.

Each $Qi=\{q_{i1}, q_{i2}, \ldots, q_{im}\}$, $Qi \subseteq G$ $q_{ij} \epsilon G$ i=1, 2, ..., x j=1, 2, ..., m Next, Qi are selected from Q such that the following equation (1) holds:

$$|q_{ij} - h_{j1}| = \min_{r \in \{1,2,\ldots,x\}} \left\{ \max_{k \in \{1,2,\ldots,m\}} \{|q_{rk} - h_{k1}|\} \right\} \quad (1)$$

Then $h_{i2}$ is scheduled to transmit at $q_{ij}$.

Next, all the blocks scheduled for kth stream should be reordered in an increasing sequence. The transmission time of the blocks is represented as $V_k=\{v_{k1}, v_{k2}, \ldots, v_{ky}\}$. So the delay of the playback time is equal to:

$$d = \max\{0, \max_{i \in [1,y]} \{(v_{ki} - u_{ki})\}\}.$$

If the delay needed is within the user's latency tolerance, i.e., the delay parameter or limit is satisfied, the system transmits video blocks as scheduled. If the delay needed is beyond the latency tolerance, i.e., the delay parameter or limit is not satisfied, the request is refused and an earliest possible start time is sent back to the requester.

For example, in FIG. 4, when request 3 arrives, the available bandwidth is not enough for transmitting a stream. And the earliest start time is $T_3$. Therefore, the stream 3 will transmit those blocks that have been transmitted in $[a_2, a_3]$, and the first block of stream 3 will be transmitted at time $T_3$ where $T_3>a_3$.

Another aspect of the invention involves selecting appropriate under load timeslots, i.e., determining appropriate time intervals during which bandwidth is available. An exemplary embodiment for choosing the proper under-load timeslots to modify or adjust the schedule providing rearrangement is described below in regard to FIG. 5. Steps 210 to 250 in FIG. 5 correspond to like-identified steps in FIG. 2. As explained above, considerations during adjustment of the initiatory schedule may include satisfying one or both of the following conditions:

Condition 1: providing a minimum initial delay

Condition 2: maximizing sharing of transmission of content for a particular request with later requests by, e.g., transmitting blocks as late as possible. That is, in accordance with condition 1, the schedule includes a first time for starting delivery of an initial portion of the content that provides for a minimum initial delay. In addition, in accordance with condition 2, the schedule includes a second time for starting delivery of a subsequent portion of the content, such as a second block, that increases the delay of delivery of the subsequent portion to be as late as possible while still satisfying the delay parameter or limit.

An exemplary embodiment for providing a system for satisfying both conditions provides for considering condition 1 first and then, after satisfying the first condition, considering the second condition. Satisfying the first condition of providing minimum initial delay will be referred to as a first-pass of schedule modification. During the first pass, two procedures occur: under-load time slot selection and block shifting.

Figure 5:
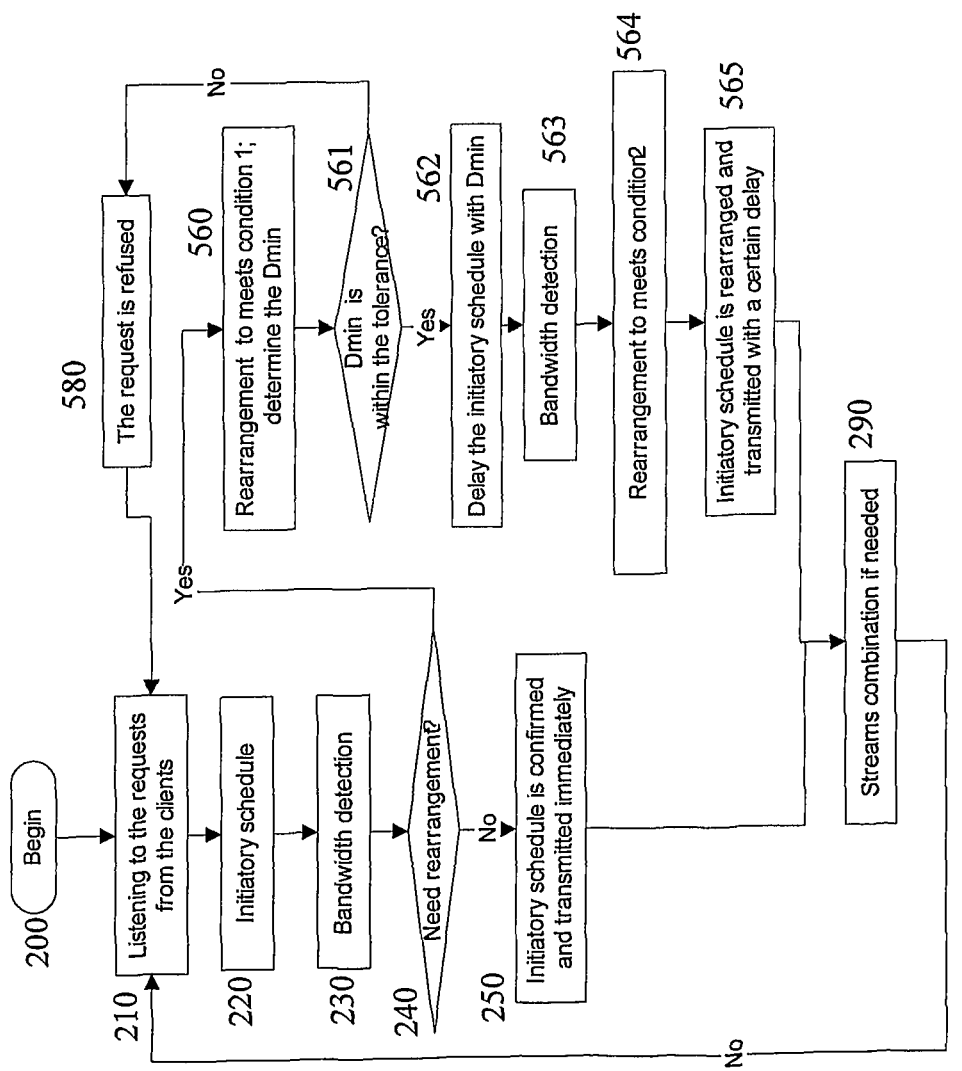
FIG. 5 showing, in flowchart format, an aspect of the system of FIG. 1 relating to scheduling communication of content in accordance with principles of the invention.

In order to achieve the minimum initial delay, i.e., within the delay tolerance, as in step 560 of FIG. 5, the earliest available under load time slots should be selected to contain the overload blocks. That is, if the total number of over load blocks of the stream being scheduled is m, then we should choose the first m under-load timeslots from L. Then, the overload blocks will be shifted to the m-selected under-load timeslots respectively, i.e., a portion of the content is delayed.

The shift or delay occurs as follows. If an over-load block $h_{i2}$ (at the timeslot $h_{i1}$) needs to be moved to the under-load time slot $l_{j1}$, then there are 2 cases to consider. In case 1, i.e., if $l_{j1} < h_{i1}$, the block at the time slot directly next to the $l_{j1}$ will be moved to the $l_{j1}$, and all the blocks between ($l_{j1}$, $h_{i1}$) should be moved to the time slot just directly prior to itself in turn, the block $h_{i2}$ (at the timeslot $h_{i1}$) will be moved to the time slot directly prior to the $h_{i1}$. In case 2, i.e., if $l_{j1} > h_{i1}$, the block at the timeslot directly prior to the $l_{j1}$ will be moved to the $l_{j1}$, and all the blocks between ($h_{i1}$, $l_{j1}$) should be moved to the timeslot just directly next to itself in turn, the block $h_{i2}$ (at the timeslot $h_{i1}$) will be moved to the timeslot directly next to the $h_{i1}$.

Next, the minimum initial delay d can be determined. Let the transmission time of the blocks after initiatory schedule be represented as $U = \{u_1, u_2, \ldots, u_y\}$ and let the transmission time of the blocks after the first pass reschedule be represented as $V = \{v_1, v_2, \ldots, v_y\}$ Then, the minimum delay d is determined as follows:

$$d = \max\{0, \max_{i \in [1,y]}\{(v_i - u_i)\}\}$$

Next, at step 561, the minimum delay is checked to determine if the minimum delay is within the tolerance, i.e., whether the schedule will satisfy the delay parameter or limit. If not, the request is rejected at step 580. If the minimum delay is acceptable (i.e., within tolerance or satisfies the delay parameter or limit), a second pass of scheduling occurs for considering the second condition of maximum data sharing. That is, in response to determining that the delay parameter is satisfied, a second pass occurs to modify the schedule to delay delivery of at least a portion of the content. After the first pass, the minimum initial delay $D_{min}$ for the schedule is determined and the initiatory scheduled stream is delayed with $D_{min}$ at step 562. Then, bandwidth detection occurs at step 563 and all the over-load blocks and all the under-load timeslots are found. From the last over-load block to the first over-load block, shifting occurs at step 564 to move the over-load block to the under-load timeslot respectively which lies before its current position and has the minimum distance to its current position. This shifting or delaying or rearrangement is explained in detail below.

After delaying the initiatory schedule with $D_{min}$, for each overload block, it is possible to always find at least one under-load timeslot, which lies before the overload timeslot, to "hold" the overload block. This proceeds as follows.

First, the stream is scheduled with the minimum initial delay by delaying the initiatory schedule with $D_{min}$. That is, for the kth stream, all the blocks that have been transmitted in $[a_{k-1}, a_k]$ are scheduled to transmit at their time offset from the first block plus Dmin. The transmission time of the blocks is presented as $U = \{u_1 + D_{min}, u_2 + D_{min}, \ldots, u_y + D_{min}\}$.

Next bandwidth detection occurs. After delaying the schedule, the bandwidth of the timeslots has been changed. Therefore, it is necessary to do bandwidth detection again in order to find all the overload blocks and all the under-load timeslots.

Next, the scheduled blocks are rearranged. Rearrangement is similar to that of the first pass schedule. It also includes two procedures: under-load timeslots selection and blocks shifting.

In order to determine which under-load timeslots will be chosen to contain the overload blocks, the selection occurs from "back" to "front". That is, first it is determined which under-load time slot will contain the last (on the time axis) overload block, and then it is determined which under-load timeslot will contain the second last (on the time axis) overload block, and so on. For the overload block $h_{i2}$ (at the timeslot $h_{i1}$), the under-load timeslot $l_{j1}$ which contains $h_{i2}$, is determined as follows:

$$h_{i1} - l_{j1} = \min_{l_{r1} \in L_{iprior}} \{h_{i1} - l_{r1}\}$$

$L_{iprior}$ is the subset of all the under-load timeslots which lies before $h_{i1}$ (less than $h_{i1}$). That is, the under-load timeslot $l_{j1}$ has the minimum distance to $h_{i1}$ among all the under-load timeslots which lie before $h_{i1}$.

Block shifting of the second pass schedule is identical to that of the first pass schedule. However, only case 1 exists because the selected under-load timeslot is before the overload timeslot, so the block shifting of the second pass has only case 1.

Another aspect of the invention involves combining content streams as in step 590 of FIG. 5 such that after streams combination, one or multiple requests will correspond to a stream. Stream combination occurs as follows. When the current request time is before the transmission start time of the previous stream, the current stream will be combined with the previous one. The combination results in one stream which will serve two requests. For example, when request 5 arrives, due to no sufficient resources for the request 5, the earliest start time of transmission for stream 5 is scheduled to $T_5$. So request 5 will be served in a latency mode. During the waiting time, request 5 also receives the multicast data and buffers them. And then request 6 arrives, which is before the start time of the request 5, $t_5 > a_6$ (If the duration of a block granularity is used, there is $t_5 = a_6$.). Therefore request 5 can be combined with request 6. After the combination, there is a new stream S5 will be scheduled corresponding to both request 5 and request 6. From FIG. 4 it can be seen that all the requests arriving in the period $[a_5, a_6]$ will be combined into one stream.

Streams are transmitted to clients according to the schedule in step 565. There are several ways in which the streams can be multicast to the clients. One possibility is a unique multicast stream for each user request of the content. Another possibility is a single multicast stream with all the user requests. The advantage of the first approach is that a user needs to only subscribe to the multicast streams of interest and the irrelevant streams will not reach the user. The latter approach needs to filter the redundancy data at the client.

The above described aspects of the invention may be better understood by considering the following explanation of the described exemplary embodiment in conjunction with FIG. 4. As described above, an exemplary embodiment involves a VOD server that handles multiple requests for a video program. The server can store more than one video program, but the described embodiment particularly relates to requests for the same video program. The video program is illustratively divided into N blocks, the communication channel can transmit at most M blocks in a time slot, and each block can be transmitted in a time slot. In FIG. 4, N equals 20 and M equals 3. When a client device submits a request, the client device starts to collect all the video blocks in the communication channel and arrange the video blocks in proper order. When all the blocks of the requested video program have been received, the client device can start playing back the requested video program.

In the example of FIG. 4, streams S0 through S5 are depicted which are responsive to requests R0 through R6. S2 starts transmitting blocks 0-4 and 8-12 from time slots 13-17 and 21-25, respectively. S3 starts transmit blocks 0, 1, 5, 6, 13, and 14 at timeslot 16, 17, 20, 21, 28, 29 respectively. S4 starts transmitting blocks 0-4, 7, and 15-17 from time slots 18-22, 25, and 34-36, respectively. S5 starts transmit blocks 0-6, 8, 9, 18, and 19 from time slots 23-29, 31, 32, 42, and 43, respectively. Also, when request R5 arrives, the scheduled result shown in FIG. 4 indicates the block 0 of S5 will start transmission at timeslot 23. However, request R6 arrives before timeslot 23, so S5 and S6 will be combined as one stream.

When client device 0 requests for the video program (request R0 in FIG. 4) at time a0 or time slot 0, the server creates the initial schedule U0 for the reference stream, S0, which is (0, 1, 2, . . . , 19) indicating that block i of the video is scheduled transmit at time slot i. Since no blocks of the video program have been transmitted in the communication channel, all 20 blocks must be transmitted. Since there is no over load time slot, the initial schedule U0 becomes the final schedule V0 without being rearranged. Although the server can transmit three blocks in each time slot, in this embodiment, the server transmits a video block in each time slot. Although the blocks are transmitted in sequence starting from block 0, it is not required because each client device can reassemble all the blocks in proper sequence for playing back.

Since the server transmits one block per time slot in response to request 0, a bandwidth of two blocks in each time slot is available for other requests.

Client device 1 submits a request (R1 in FIG. 4) at time a1 or time slot 8, and starts to receive video blocks in the communication channels. Since blocks 8-19 are already available in the communication channel, the server transmits only blocks 0-7, which are those blocks transmitted in time interval [a0, a1]. The server creates an initial schedule U1 for stream 1, S1, for blocks 0-7 as (8, 9, 10, . . . , 15). Since there is no overload time slot, the initial schedule U1 becomes the final schedule V1 for stream 1 without being rearranged.

At time a2 or time slot 13, client device 2 submits a request (R2 in FIG. 4). At this point, the communication channel is transmitting blocks 5-7 and 13-19. The server only has to transmit blocks 1-4 and 8-12, which are the blocks transmitted in the time interval [a1, a2]. The server creates an initial schedule U2 for stream 2 (S2) for transmitting blocks 1-4 and 8-12, which is (13, 14, 15, 16, 17, 21, 22, 23, 24, 25). In an initial schedule, the time for transmitting the first block is the time when a request was received. All the blocks in S2 can be scheduled to be transmitted in consecutive time slots. However, to increase the flexibility of bandwidth management of the transmission channel, it is preferred that only consecutive blocks are initially scheduled to be transmitted in consecutive time slots. If there is a discontinuity in block number between two consecutive blocks, for example, block i and block i+j, and block i is scheduled to be transmitted at time slot k in the corresponding initial schedule, the server should initially schedule block i+j to be transmitted at time slot k+j. For example, in U2, blocks 0-4 are scheduled to be transmitted at time slots 13-17 but blocks 8-12 are scheduled at time slots 21-25. Since there is no overload time slot, the initial schedule U2 becomes final schedule V2 without being rearranged.

At this point, the description has been in regard to the case described above in which the bandwidth in each time slot has not been exceeded, i.e., the time slots are under load time slots. In the following, the condition of insufficient bandwidth when a request is received is covered, i.e., the situation of overload time slots.

The schedule at this point is as follows:
Stream 0: U0=V0=(0, 1, 2 . . . 19) corresponding to blocks 0-19, respectively.
Stream 1: U1=V1=(8, 9 . . . , 15) corresponding to blocks 0-7, respectively
Stream 2: U2=V2=(13, 14, 15, 16, 17, 21, 22, 23, 24, 25) corresponds to blocks 0-4 and 8-12, respectively.

At a3 or time slot 15, receiver 3 submits a request (R3 in FIG. 4). The server checks the blocks transmitted in the interval [a2, a3], which are the blocks to be included in stream 3, S3. These blocks are blocks 0, 1, 5, 6, 13, and 14, and the server creates an initial schedule U3 to transmit these blocks, which is (15, 16, 20, 21, 28, 29). However, after checking V0-V2 and U3, the server finds that time slot 15 is over loaded, but time slot 17 and time slots onwards are under loaded. The server creates an H list, each element of which indicates the starting time slot and the corresponding overflow block number. In this case, H={(15, 0)}. The server also creates an L list keeping track of under load time slots, which are later in time than the time slot when R3 has been received. The number of the elements, w, in the L list must be at least the same as the number of elements in the H list. Preferably, w should be the latest time slot number in the V lists plus the number of blocks in the video program. In this case, it is 25+20=45. However, for simplicity, we select w in this example to the point where all bandwidth are available. As such, L in this example is as follows:
{(17, 1), (18, 2), (19, 2), (20, 2), (21, 1), (22, 2), (23, 2), (24, 2), (25, 2)}

Thus, w=9 and the number of elements in the G, n, is 1+2+2+2+1+2+2+2+2 or 16.

In computing G, we note that $g_1=17$. Other elements of G are computed from the following equation described above:
if $l_{r2}=j$, then $g_s=g_{s+1}=\ldots=g_{s+j-1}=l_{i1}$, where $$s = \sum_{r=1}^{i-1} l_{r2} + 1$$

Thus, $g_2=g_3=18$, $g_4=g_5=19$, $g_6=g_7=20$, $g_8=21$, $g_9=g_{10}=22$, $g_{11}=g_{12}=23$, $g_{13}=g_{14}=24$, and $g_{15}=g_{16}=25$.

The m index in generating Q represents the number of items in the H list. In this example, it is 1. As such, the number of elements in Q, x, is 16, and Q includes 16 lists, Q1-Q16. Each list includes only one item and $ti1=gi$.

Then, equation (1) below is used to select a $q_{ji}$ which is closest in time to the starting time slot of each element in the H list. That is:

$$|q_{ij} - h_{j1}| = \min_{r \in \{1,2,\ldots,x\}} \left\{ \max_{k \in \{1,2,\ldots,m\}} \{|q_{rk} - h_{k1}|\} \right\} \tag{1}$$

In this example, $q_{j1}=17$ is selected, which means block 0 will be transmitted at timeslot 17. After blocks reorder, V3= (16, 17, 20, 21, 28, 29), block 0 will be transmitted at timeslot 16 and block 1 will be transmitted at timeslot 17. Blocks 5, 6, 13, 14 keep their original schedule, i.e., they will be transmitted at timeslot 20, 21, 28, 29 respectively.

At this point, the server knows the delay time of one time slot. If the request requires a delay time of up to one time slot, the request is granted and the grant message includes the delay time. If the request requires a delay of less than one time slot, the request is denied and the message also includes the delay time, so that a user can submit another request with a longer waiting time.

Various modifications and/or extensions of principles described herein are contemplated. For example, for applications such as VOD the described system is flexible and scalable to support increased numbers of users. Schedule modification as described may be used to reduce or flatten the data burst impact of multiple requests and adding users by providing a reasonable latency service for some users where the definition of "reasonable" may be specified by the users. The invention is applicable to various systems including VOD systems with personal video recorder (PVR) enabled customers. For example, when a PVR is available, a later arriving client joins the multicast stream delivering the media data to some earlier clients, buffers the data it received until it is needed for playback. This can reduce the server bandwidth required. A system as described herein may provide useful information to customers such as the earliest access time of particular content. For example, the system may provide a list of video name and their respective earliest access time. The earliest access time helps users to make a rational request for content, which can avoid meaningless requests from users and increase system efficiency. The described system operates in accordance with a multicast transmission schedule arranged according to the arrival of the requests, current available bandwidth and the users' tolerable delay. This system can make a trade off between server bandwidth and service latency. It can combine streams dynamically to enable clients to optimally share data.

The invention claimed is:

1. A method of communicating content comprising:
   receiving a request for a content;
   generating a schedule for delivering the content;
   generating a potential schedule rearrangement for the schedule;
   determining whether the potential schedule rearrangement will satisfy a user-specified delay parameter of the request that represents a maximum delay for the receipt of the content; and
   modifying the schedule according to the potential schedule rearrangement using a processor to delay delivery of a portion of the content responsive to determining that the delayed delivery falls within the user-specified delay parameter.

2. The method of claim 1 wherein modifying the schedule comprises:
   detecting a first time interval of the schedule for delivering the content during which bandwidth is available; and
   adjusting the schedule for delaying delivery of the portion of the content to occur during the time interval.

3. The method of claim 2 wherein the request is received from a client device and the delay parameter comprises a delay limit established by a user of the client device.

4. The method of claim 1 wherein the schedule comprises a plurality of time intervals including a first time interval during which delivery of the portion of the content is scheduled for delivery, the content comprises a plurality of blocks of information, and the portion comprises a first one of the plurality of blocks of information; and
   wherein modifying the schedule comprises:
      determining that additional bandwidth is needed to deliver the portion of the content during the first interval;
      delaying transmission of the first block to occur during a second time interval during which additional bandwidth is available, the second time interval occurring subsequent to the first time interval; and
      determining whether a delay in transmission resulting from a delay from the first interval to the second interval exceeds a delay limit associated with the delay parameter.

5. A system for delivering content comprising:
   an interface for receiving a request from a requesting device for a content;
   a scheduler coupled to the interface and responsive to the request for delivering the content to the requesting device according to a schedule, wherein the scheduler:
      generates a potential schedule rearrangement for the schedule,
      determines whether the potential schedule rearrangement will satisfy a user-specified delay parameter of the request that represents a maximum delay for the receipt of the content; and
      modifies the schedule according to the potential schedule rearrangement to delay delivery of a portion of the content and responsive to determining that the delayed delivery falls within the user-specified delay parameter.

6. The system of claim 5 wherein the scheduler modifies the schedule by:
   detecting a first time interval of the schedule for delivering the content during which bandwidth is available; and
   adjusting the schedule for delaying delivery of the portion of the content to occur during the time interval.

7. The system of claim 6 wherein the request is received from a client device and the delay parameter comprises a delay limit established by a user of the client device.

8. The system of claim 5 wherein the schedule comprises a plurality of time intervals including a first time interval during which delivery of the portion of the content is scheduled for delivery, the content comprises a plurality of blocks of information, and the portion comprises a first one of the plurality of blocks of information; and
   wherein the scheduler modifies the schedule by:
      determining that additional bandwidth is needed to deliver the portion of the content during the first interval;
      delaying transmission of the first block to occur during a second time interval during which additional bandwidth is available, the second time interval occurring subsequent to the first time interval; and
      determining whether a delay in transmission resulting from a delay from the first interval to the second interval exceeds a delay limit associated with the delay parameter.

* * * * *